United States Patent
Kang et al.

(10) Patent No.: US 9,943,164 B2
(45) Date of Patent: Apr. 17, 2018

(54) FILTER CLEANING DEVICE

(71) Applicant: Samsung Electronics Co., Ltd, Suwon-si (KR)

(72) Inventors: Wan-Ku Kang, Uiwang-si (KR); Chan Young Park, Suwon-si (KR); Hyun Uk Park, Suwon-si (KR); Geon Hee Lee, Suwon-si (KR); Jea Won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 15/019,535

(22) Filed: Feb. 9, 2016

(65) Prior Publication Data

US 2016/0227916 A1 Aug. 11, 2016

(30) Foreign Application Priority Data

Feb. 9, 2015 (KR) .................. 10-2015-0019303

(51) Int. Cl.
| | |
|---|---|
| *B01D 46/00* | (2006.01) |
| *A46B 13/02* | (2006.01) |
| *A47L 9/10* | (2006.01) |
| *B01D 46/10* | (2006.01) |
| *B08B 1/00* | (2006.01) |

(52) U.S. Cl.
CPC ............ *A46B 13/02* (2013.01); *A47L 9/106* (2013.01); *B01D 46/0065* (2013.01); *B01D 46/10* (2013.01); *B08B 1/007* (2013.01); *B08B 1/008* (2013.01); *B01D 2279/50* (2013.01); *B08B 1/002* (2013.01)

(58) Field of Classification Search
CPC ............ B01D 24/4605; B01D 24/4615; B01D 25/383; B01D 29/0077; B01D 29/64–29/6492; B01D 46/00; B01D 46/0065; B01D 46/10; B01D 2279/50; A46B 13/02; A47L 9/106; B08B 1/002; B08B 1/007; B08B 1/008
USPC .......................................... 55/289, 295–300
See application file for complete search history.

(56) References Cited

U.S. PATENT DOCUMENTS

2007/0060036 A1* 3/2007 Shibuya ............ B01D 46/0065
                                                                454/187

FOREIGN PATENT DOCUMENTS

| DE | 102008035681 A1 | 9/2009 |
|---|---|---|
| JP | 11226331 | 8/1999 |
| JP | 2009-082837 | 4/2009 |

(Continued)

OTHER PUBLICATIONS

Extended European Search Report dated Jul. 14, 2016 in connection with European Application No. 16154321.0, 7 pages.

*Primary Examiner* — T. Bennett McKenzie

(57) ABSTRACT

A filter cleaning device has an improved structure which is capable of effectively cleaning dust in a filter used in an air conditioner. The filter cleaning device includes: a filter; a brush unit movably installed at one side of the filter to separate dust from the filter; a brush movement unit configured so that the brush unit is movable along the filter; and brush guides installed at two sides of the brush unit to guide a movement of the brush unit. Each of the brush guides includes: a first guide groove formed so that the brush unit is moved to be in contact with the filter; and a second guide groove formed so that the brush unit is moved to be separated from the filter.

13 Claims, 28 Drawing Sheets

(56) References Cited

FOREIGN PATENT DOCUMENTS

| JP | 2012112550 A | 6/2012 |
|----|--------------|--------|
| JP | 2012154555 A | 8/2012 |

\* cited by examiner

FILTER CLEANING DEVICE

CROSS-REFERENCE TO RELATED APPLICATION(S) AND CLAIM OF PRIORITY

The present application is related to and claims the benefit of Korean Patent Application No. 10-2015-0019303, filed on Feb. 9, 2015 in the Korean Intellectual Property Office, the disclosure of which is incorporated herein by reference.

TECHNICAL FIELD

Embodiments of the present disclosure relate to a filter cleaning device having an improved structure which is capable of cleaning dust in a filter used in an air conditioner.

BACKGROUND

An air conditioner performs heat-exchanging by introducing outside air and discharging the heat-exchanged air to the outside. A filter is usually disposed in the air conditioner so as to filter foreign substances from the introduced outside air. Also, a filter is provided in a dehumidifier, a humidifier, and so on, in addition to the air conditioner.

When the air conditioner having the filter is continuously driven, outside air passes through the filter continuously, and foreign substances are stacked in the filter and may disturb introduction of the air. In order to prevent this problem, a cleaning device for cleaning the foreign substances attached to the filter can be used.

In some cases, a brush of the cleaning device may continuously separate dust attached to the filter. However, when the brush operates continuously, the dust can become attached to the brush such that efficiency of filter cleaning is lowered.

SUMMARY

To address the above-discussed deficiencies, it is a primary object to provide a filter cleaning device having an improved structure which may improve cleaning efficiency of a filter.

It is another aspect of the present disclosure to provide a filter cleaning device configured to be moved to be in contact with or separated from a filter depending on a movement direction.

It is another aspect of the present disclosure to provide a filter cleaning device having an improved structure which may effectively remove dust attached to a brush for removing dust of a filter.

It is another aspect of the present disclosure to provide a filter cleaning device having an improved structure which may move dust separated from a brush for removing dust of a filter to the outside.

Additional aspects of the disclosure will be set forth in part in the description which follows and, in part, will be obvious from the description, or may be learned by a practice of the disclosure.

In accordance with one aspect of the present disclosure, a filter cleaning device includes: a filter; a brush unit movably installed at one side of the filter to separate dust from the filter; a brush movement unit configured so that the brush unit is movable along the filter; and brush guides installed at two sides of the brush unit to guide a movement of the brush unit. Each of the brush guides includes: a first guide groove formed so that the brush unit is moved to be in contact with the filter; and a second guide groove formed so that the brush unit is moved to be separated from the filter.

Each of the brush guides may further include a first movement portion formed so that the brush movement unit is movable between the first guide groove and the second guide groove, and in the first movement portion, the first guide groove may be provided as a stepped shape higher than the second guide groove.

Each of the brush guides may further include a second movement portion that is formed at an opposite side to the first movement portion and formed so that the brush unit is movable between the first guide groove and the second guide groove, and in the second movement portion, the first guide groove may be provided as a stepped shape lower than the second guide groove.

The brush unit may include: a brush body; a brush installed in the brush body facing filter; slide members installed at two sides of the brush body and provided to be movable at insides of the first guide groove and the second guide groove; and a first elastic member installed between each slide member and the brush body.

The brush unit may further include: a coupling housing including a first region coupled to the brush body and a second region movably coupled to the brush movement unit; a distance adjustment member disposed in contact with one side of the brush body so as to move the brush body in the first region; and a second elastic member disposed between the brush body and the coupling housing at an opposite side of the distance adjustment member in the first region.

The distance adjustment member may include: a first adjuster having a first thickness; and a second adjuster having a second thickness provided to be thicker than the first thickness.

The brush movement unit may include: a shaft provided to be rotatable and extending in a movement direction of the brush unit; rack gears formed in parallel with the shaft; worm gears coupled to be movable along the shaft when rotated in engagement with the rack gears according to a rotation direction of the shaft; and a driving member configured to generate a rotational force which is transferred to the shaft, wherein the worm gears may be disposed in the second region and are movable together with the brush unit.

The filter cleaning device may further include a dust separation member disposed below the filter so as to separate dust attached to the brush. The dust separation member includes: a rotating body disposed in parallel with the brush body; a motor configured to transfer a rotational force to the rotating body; and a dust separator formed at an outside of the rotating body so as to separate the dust attached to the brush when the dust separator is rotated together with the rotating body.

The dust separator may be provided in a spiral shape.

The filter cleaning device may further include a dust discharge unit configured to move the dust separated from the brush. The dust discharge unit includes: a suction case formed below the dust separator and the brush and having an opening into which the dust separated from the brush is introduced; a suction motor configured to generate a suction force which is transferred to the suction case; and a suction cover configured to open and close the opening.

The dust discharge unit may further include a cover adjuster coupled to be movable along the brush movement unit and having a first gear portion formed in a side opposite to the suction cover, and the suction cover may include a second gear portion formed to be opposite to the first gear portion so as to be engaged with the first gear portion.

The cover adjuster may be configured to be moved between a first position and a second position, and the cover adjuster may be disposed on a movement path of the brush unit, may be moved from the first position to the second position to be in contact with the brush unit, and may move the suction cover so that the opening is opened.

The dust discharge unit may further include a restoring member installed at one side of the cover adjuster, and the restoring member may restore the cover adjuster from the second position to the first position.

In accordance with another aspect of the present disclosure, a filter cleaning device includes: a filter; a brush unit movably installed at one side of the filter to separate dust from the filter; a brush movement unit configured so that the brush unit is movable along the filter; and a dust separation member disposed below the filter so as to separate dust attached to the brush unit. The dust separation member includes: a rotating body disposed in parallel with the brush unit; a motor configured to transfer a rotational force to the rotating body; and a dust separator formed at an outside of the rotating body to have a spiral shape so as to separate the dust attached to the brush unit when the dust separator is rotated together with the rotating body.

The filter cleaning device may further include a dust discharge unit configured to move the dust separated from the brush. The dust discharge unit includes: a suction case formed below the dust separator and the brush unit and having an opening into which the dust separated from the brush unit is introduced; a suction motor configured to generate a suction force which is transferred to the suction case; and a suction cover configured to open and close the opening.

The dust discharge unit may further include a cover adjuster coupled to be movable along the brush movement unit and having a first gear portion formed in a side opposite to the suction cover, and the suction cover may include a second gear portion formed to be opposite to the first gear portion so as to be engaged with the first gear portion.

The cover adjuster may be configured to be moved between a first position and a second position, and the cover adjuster may be disposed on a movement path of the brush unit, may be moved from the first position to the second position to be in contact with the brush unit, and may move the suction cover so that the opening is opened.

The dust discharge unit may further include a restoring member installed at one side of the cover adjuster, and the restoring member may restore the cover adjuster from the second position to the first position.

The filter cleaning device may further include brush guides installed at two sides of the brush unit to guide a movement of the brush unit. Each of the brush guides includes: a first guide groove formed so that the brush unit is moved to be in contact with the filter; and a second guide groove formed so that the brush unit is moved to be separated from the filter.

Each of the brush guides may further include a first movement portion formed so that the brush movement unit is movable between the first guide groove and the second guide groove, and in the first movement portion, the first guide groove may be provided as a stepped shape higher than the second guide groove.

Each of the brush guides may include a second movement portion that is formed at an opposite side to the first movement portion and formed so that the brush unit is movable between the first guide groove and the second guide groove, and in the second movement portion, the first guide groove may be provided in a stepped shape lower than the second guide groove.

The brush unit may include: a brush body; a brush installed in the brush body facing the filter; slide members installed at two sides of the brush body and configured to be movable at insides of the first guide groove and the second guide groove; and an elastic member installed between each slide member and the brush body.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
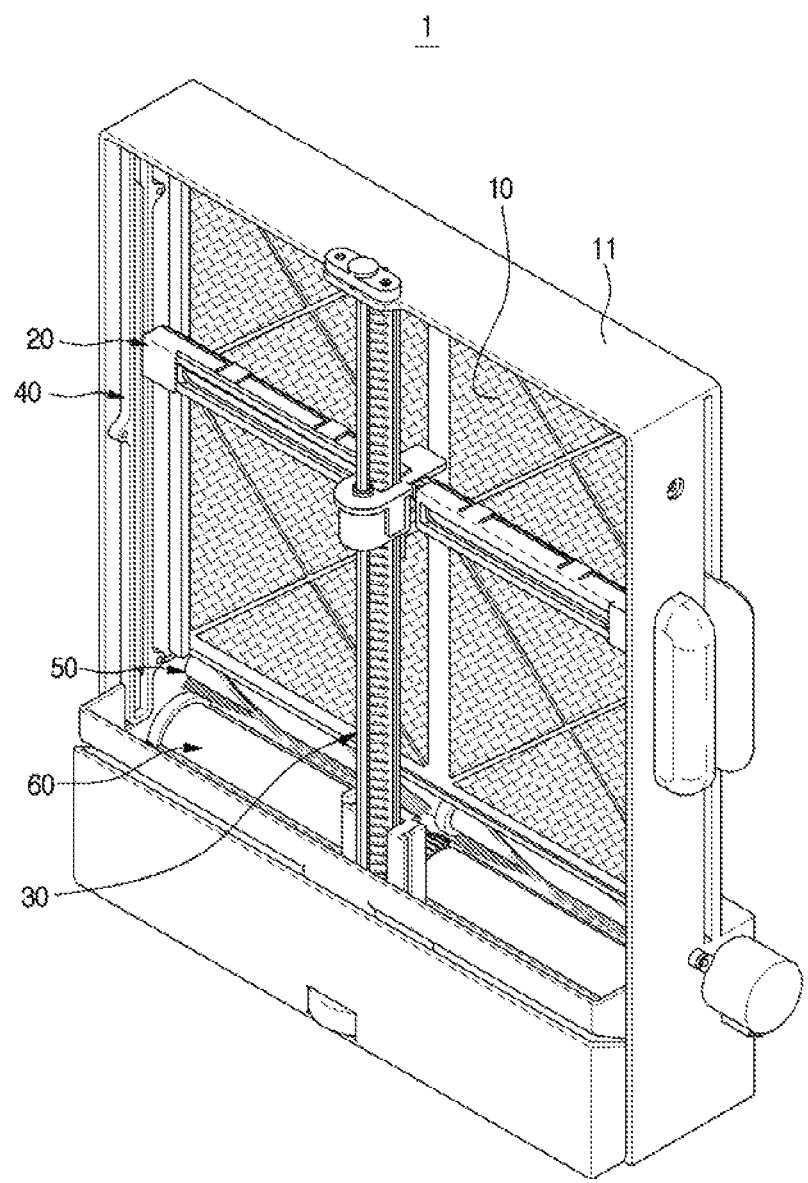
FIG. 1 is a perspective view of an exterior of a filter cleaning device in accordance with one embodiment of the present disclosure.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Reference will now be made in more detail to embodiments of the present disclosure hereinafter, examples of which are illustrated in the accompanying drawings, wherein like reference numerals refer to like elements throughout.

A filter cleaning device 1 in accordance with an embodiment of the present disclosure may be installed in an air conditioner having a filter. Also, the filter cleaning device 1 may be installed in a dehumidifier or a humidifier having a filter in addition to the air conditioner. Hereinafter, the filter cleaning device 1 will be described on the assumption that the filter cleaning device 1 is installed in a device having a filter, such as the air conditioner.

Figure 2:
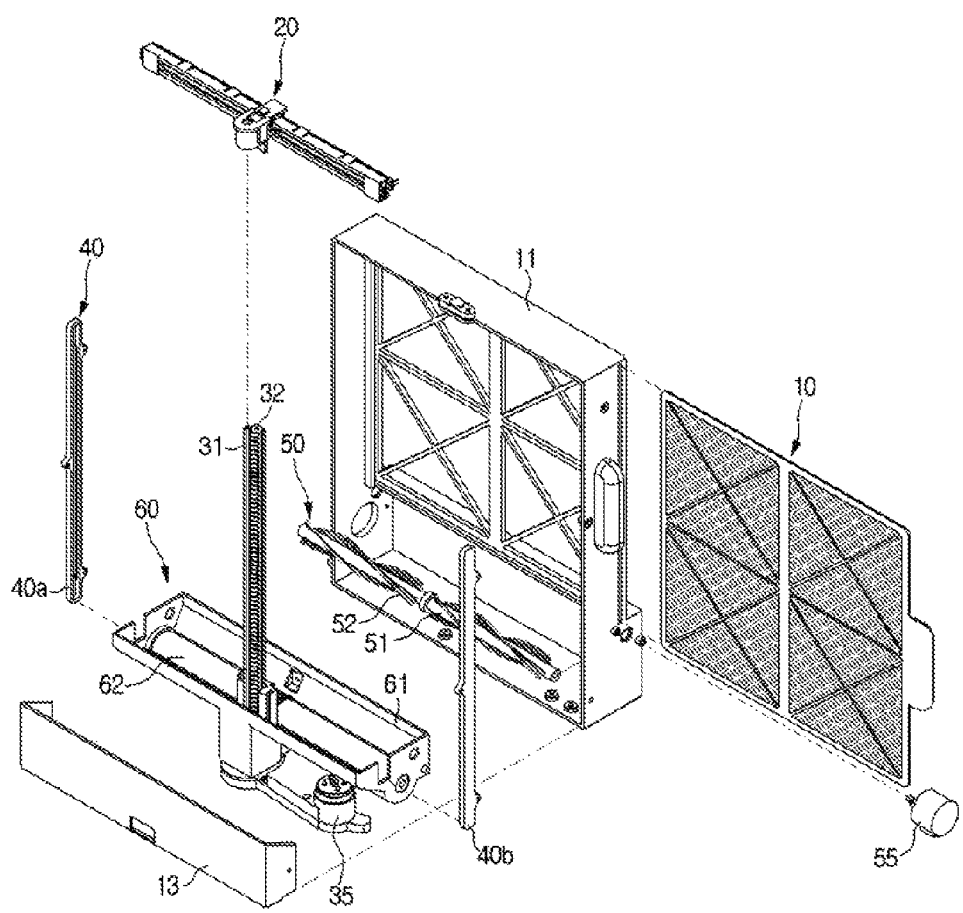
FIG. 2 is an exploded perspective view of a configuration of the filter cleaning device of FIG. 1.
Figure 3:
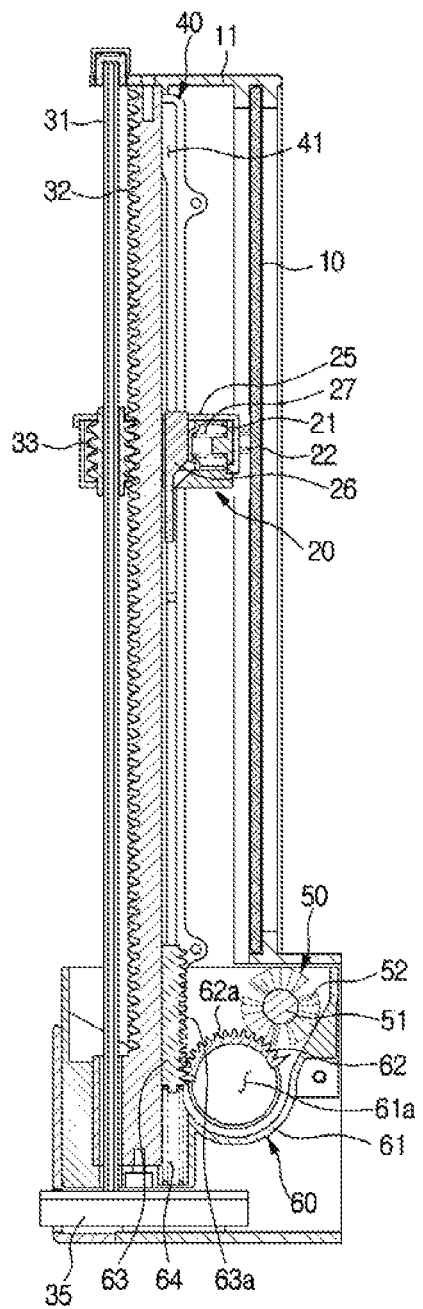
FIG. 3 is a cross-sectional view of the filter cleaning device of FIG. 1.

FIG. 1 is a perspective view of an exterior of the filter cleaning device 1 in accordance with the embodiment of the present disclosure, FIG. 2 is an exploded perspective view of a configuration of the filter cleaning device 1 of FIG. 1, and FIG. 3 is a cross-sectional view of the filter cleaning device 1 of FIG. 1.

Referring to FIGS. 1 through 3, the filter cleaning device 1 may include a filter 10, a brush unit 20, and a brush movement unit 30.

The filter 10 may be included in a product into which outside air is introduced, such as an air conditioner. In the current embodiment of the present disclosure, the filter 10 is installed in a frame 11. However, when the filter 10 is actually installed in the air conditioner, the filter 10 may also be installed directly in the air conditioner without the need of the frame 11. In addition, as described above, the filter 10 may also be installed in an electronic product, such as a humidifier or a dehumidifier, in addition to the air conditioner. In addition, in the current embodiment of the present disclosure, the filter 10 is formed in a rectangular shape. However, the filter 10 may be provided in various shapes according to a product in which the filter 10 is installed.

Figure 4:
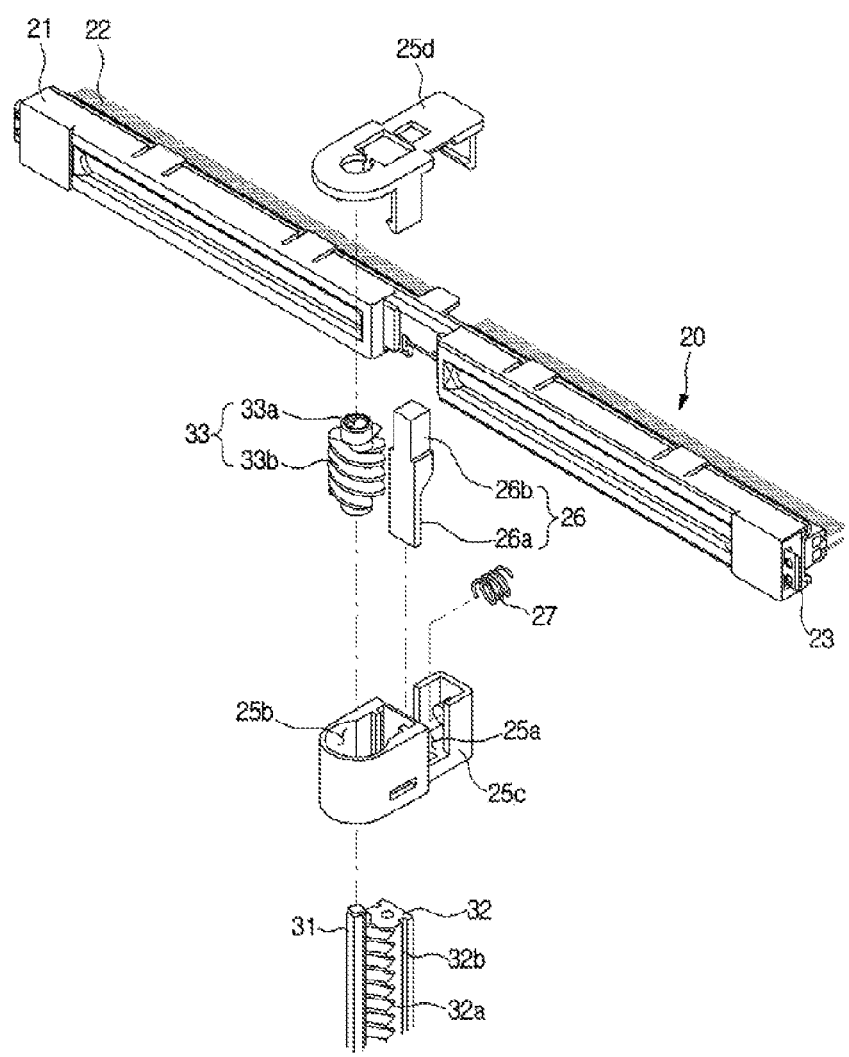
FIG. 4 is an exploded perspective view of a configuration of a brush unit of the filter cleaning device of FIG. 1.
Figure 5:
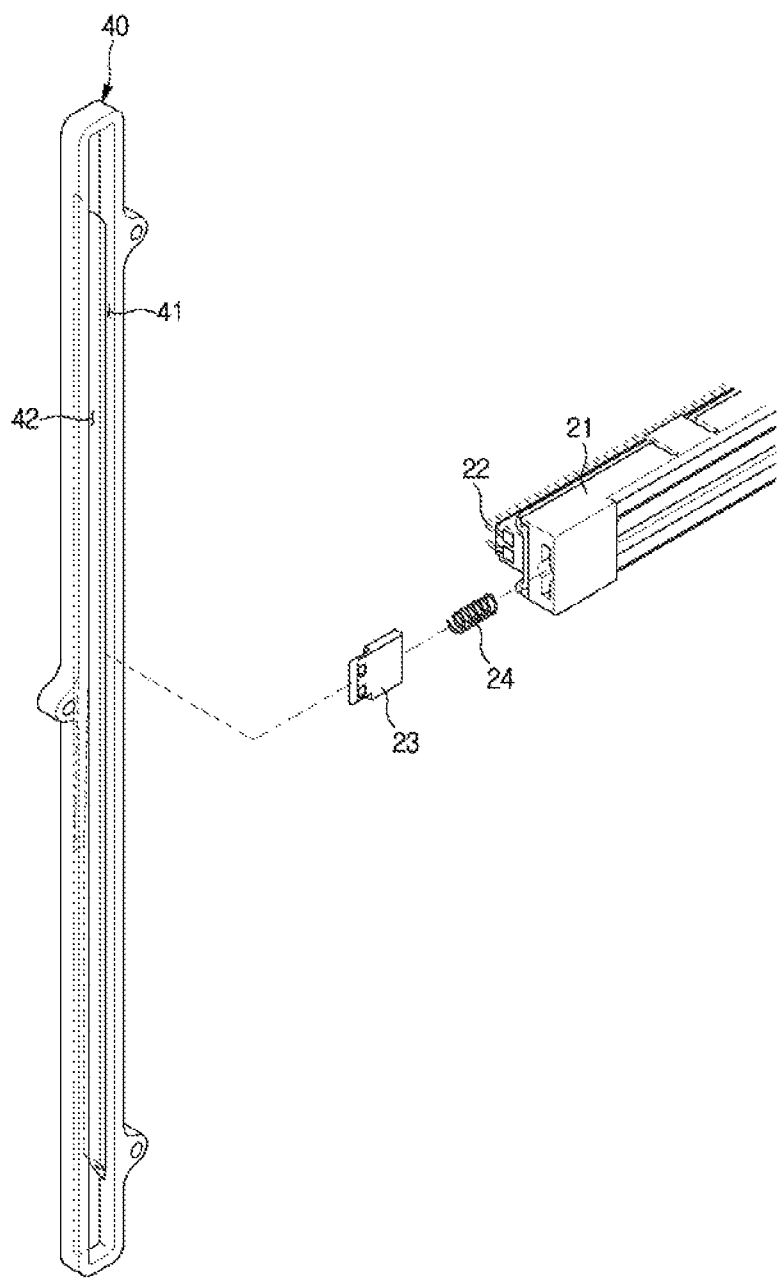
FIG. 5 is a view illustrating a coupling relationship of the brush unit and brush guides of the filter cleaning device of FIG. 1.

FIG. 4 is an exploded perspective view of a configuration of the brush unit 20 of the filter cleaning device 1 of FIG. 1, and FIG. 5 is a view illustrating a coupling relationship of the brush unit 20 and brush guides of the filter cleaning device 1 of FIG. 1.

As illustrated in FIGS. 1 through 5, the brush unit 20 may include a brush body 21 and a brush 22.

The brush 22 may be installed at one side of the brush body 21. The brush 22 may be formed at an opposite side of the brush body 21 from the filter 10 so as to extend toward the filter 10. The brush 22 may be moved to be in contact with the filter 10 and may separate dust attached to the filter 10.

The brush body 21 may be disposed to have a length corresponding to a length of one side of the filter 10. Thus, the brush body 21 may be formed such that the brush 22 may contact all regions of the filter 10 while being moved by the brush movement unit 30.

The brush unit 20 may further include a coupling housing 25. The coupling housing 25 may include a first region 25a at which the coupling housing 25 is coupled to the brush body 21, and a second region 25b at which the coupling housing 25 is coupled to the brush movement unit 30. The coupling housing 25 may be coupled to a center of the brush body 21. The coupling housing 25 may include a body portion 25c at which the first region 25a and the second region 25b are formed, and an upper cover 25d that opens and closes an upper portion of the body portion 25c.

Figure 6:
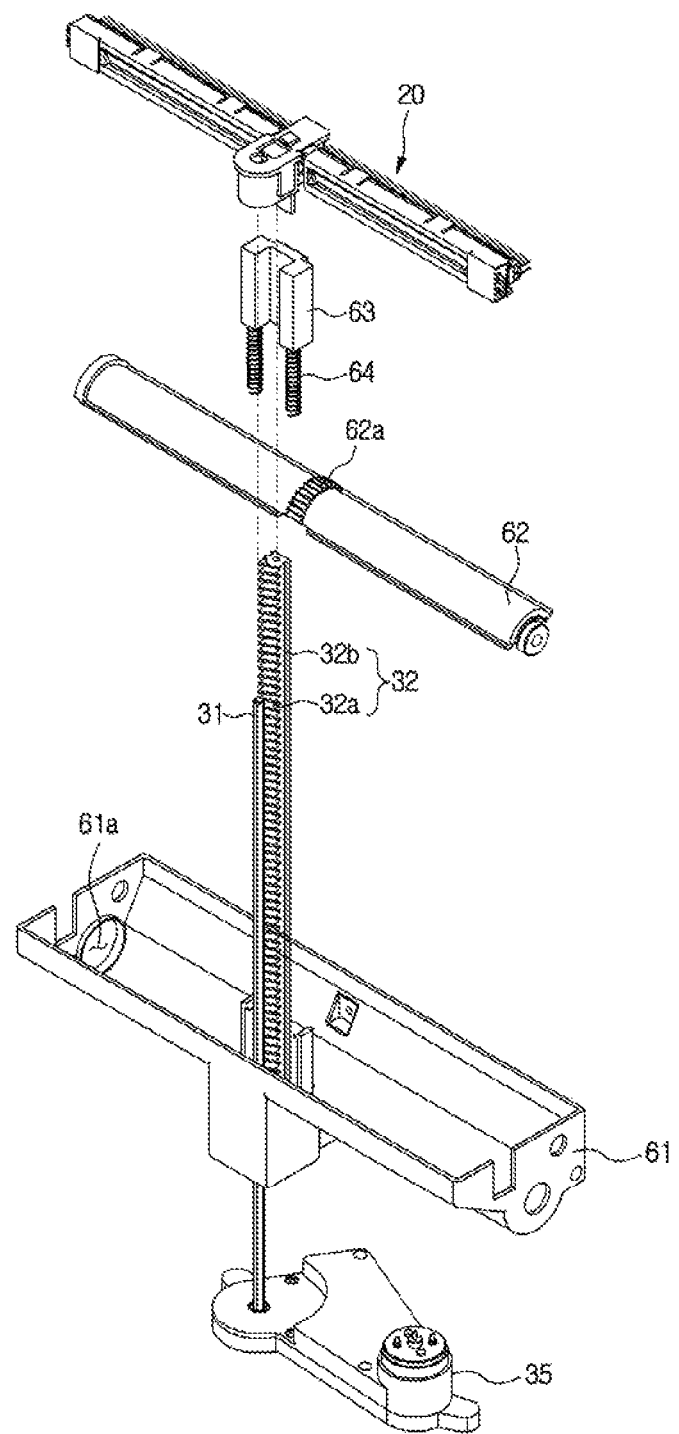
FIG. 6 is a view of a configuration of the brush unit, a brush movement unit, and a dust discharge unit of the filter cleaning device of FIG. 1.
Figure 7:
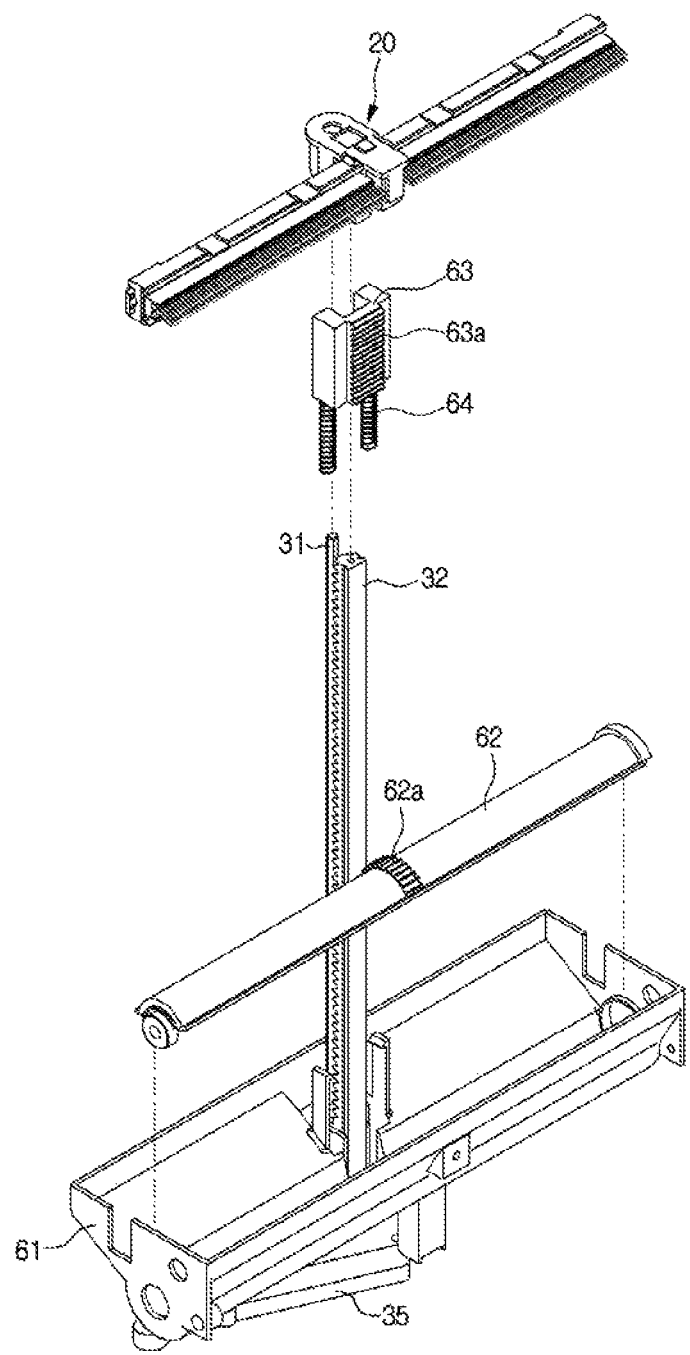
FIG. 7 is a view illustrating opposite sides of the brush unit, the brush movement unit, and the dust discharge unit illustrated in FIG. 6.

FIG. 6 is a view of a configuration of the brush unit 20, the brush movement unit 30, and a dust discharge unit of the filter cleaning device 1 of FIG. 1, and FIG. 7 is a view illustrating opposite sides of the brush unit 20, the brush movement unit 30, and the dust discharge unit illustrated in FIG. 6.

Referring to FIGS. 1 through 7, the brush movement unit 30 may move the brush body 21 along the filter 10. The brush movement unit 30 may include a shaft 31, rack gears 32, worm gears 33, and a driving member 35.

The shaft 31 may be formed in a movement direction of the brush unit 20. The shaft 31 may be formed from one end to the other end of the filter 10 so that the brush unit 20 may be moved along the filter 10. The shaft 31 may be rotatably installed. The shaft 31 may be connected to the driving member 35 and may receive a rotational force from the driving member 35.

The rack gears 32 may be disposed in parallel to the shaft 31. The rack gears 32 may be disposed in a position where the rack gears 32 are opposite the shaft 31. Each of the rack gears 32 may include a gear portion 32a formed on an opposite side from the shaft 31. Each rack gear 32 may further include rack gear guide grooves 32b that are formed at both sides at which the gear portion 32a is formed and guide movement of a cover adjuster 63, which will be described later.

The worm gears 33 may be coupled to be moved along the shaft 31. Each of the worm gears 33 may include a cavity 33a and a gear 33b formed at a side of each worm gear 33. Each worm gear 33 may be rotated about the cavity 33a together with the shaft 31, and be configured to be moved along the shaft 31. The worm gears 33 may be disposed so that the gears 33b may respectively be engaged with the gear portions 32a of the rack gears 32. Thus, each worm gear 33 may be configured to be moved to both sides of the shaft 31 according to a rotation direction of each worm gear 33 while rotating together with the shaft 31.

Each worm gear 33 may be disposed in the second region 25b of the coupling housing 25. Each worm gear 33 may be installed to be rotatable in the second region 25b. Thus, the worm gears 33 may be moved to both sides of the shaft 31 together with the brush unit 20.

The driving member 35 is connected to one side of the shaft 31 and generates a rotational force which is transferred to the shaft 31. The driving member 35 may be configured so that the rotational force generated by the driving member 35 is transferred to the shaft 31, and each worm gear 33 rotated together with the shaft 31 is moved along each rack gear 32.

Figure 8:
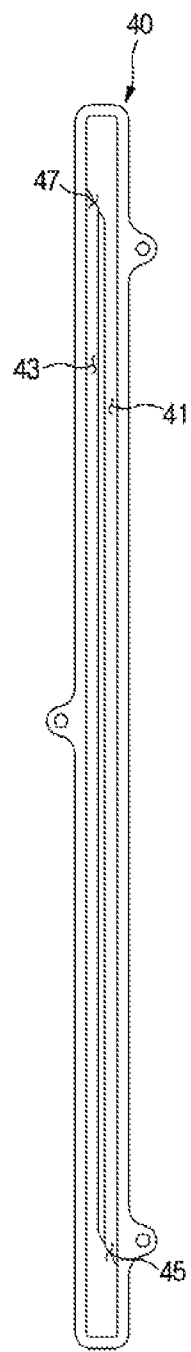
FIG. 8 is a view illustrating the brush guide of the filter cleaning device of FIG. 1.
Figure 9:
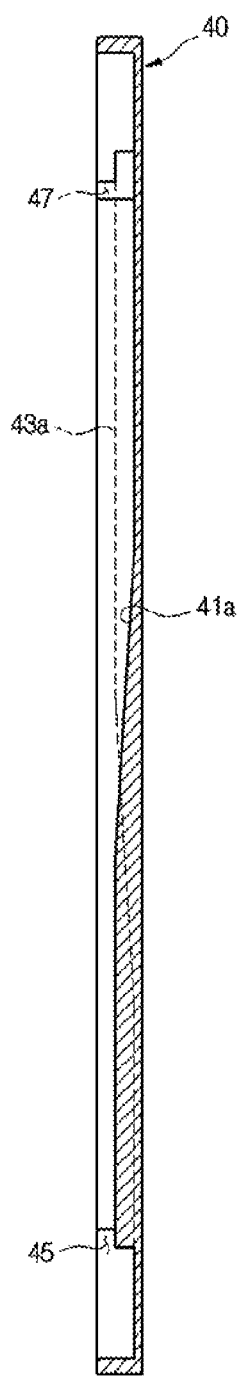
FIG. 9 is a view illustrating a longitudinal section of the brush guide of FIG. 8.
Figure 10:
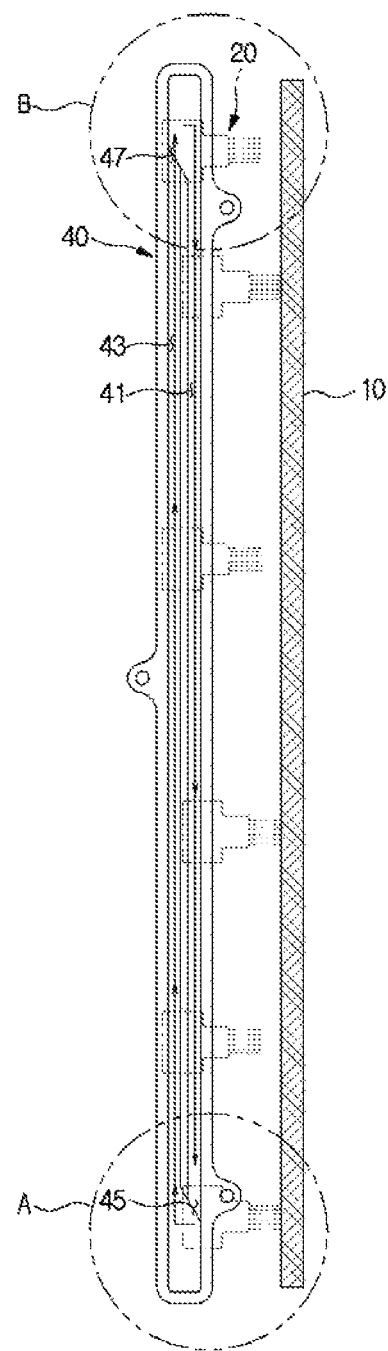
FIG. 10 is a view schematically illustrating a path on which the brush unit of the filter cleaning device of FIG. 1 is moved along the brush guide.
Figure 11:
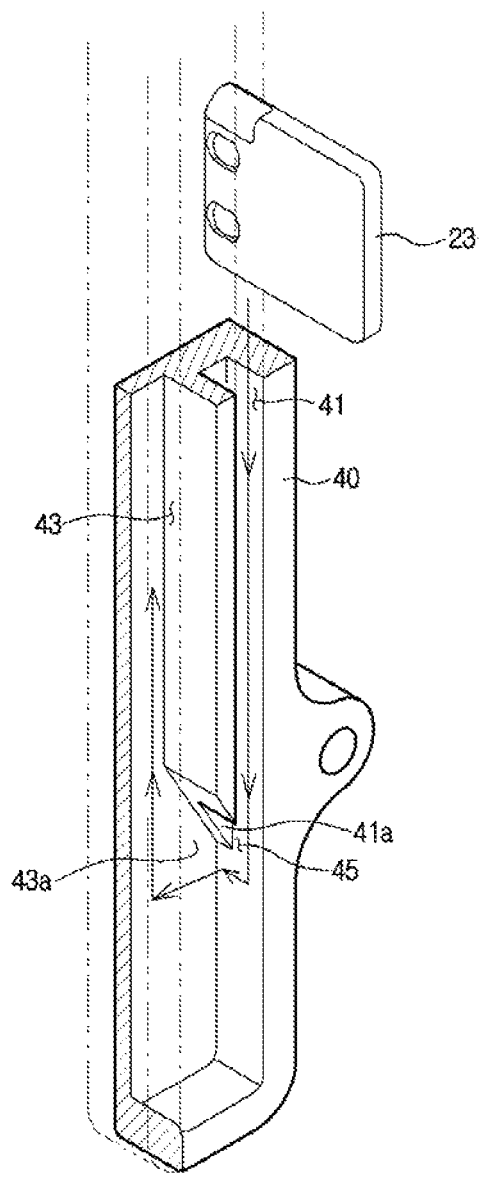
FIG. 11 is an enlarged view of region A of FIG. 10.
Figure 12:
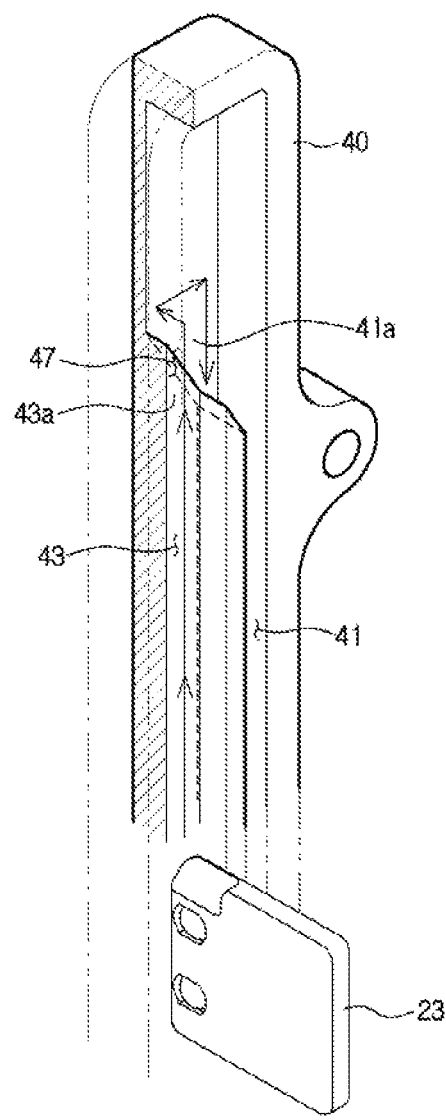
FIG. 12 is an enlarged view of region B of FIG. 10.

FIG. 8 is a view illustrating the brush guide of the filter cleaning device 1 of FIG. 1, FIG. 9 is a view illustrating a longitudinal section of the brush guide of FIG. 8, FIG. 10 is a view schematically illustrating a path on which the brush unit 20 of the filter cleaning device 1 of FIG. 1 is moved along the brush guide, FIG. 11 is an enlarged view of region A of FIG. 10, and FIG. 12 is an enlarged view of region B of FIG. 10.

Referring to FIGS. 1 through 12, the filter cleaning device 1 may further include brush guides 40.

The brush guides 40 may be installed at both sides of the brush unit 20. Each of the brush guides 40 may include a first brush guide 40a and a second brush guide 40b that are respectively installed at both sides of the brush unit 20. Each brush guide 40 may guide a movement of each of both sides of the brush unit 20 so as to guide the movement of the brush unit 20.

Each brush guide 40 may include a first guide groove 41 and a second guide groove 43 formed in the brush guide 40. The first guide groove 41 may be formed closer to the filter 10 than the second guide groove 43. The first guide groove 41 may be formed in parallel to the filter 10. The first guide groove 41 may be formed so that the brush unit 20 may be moved in a state in which the brush 22 is in contact with the filter 10.

The second guide groove 43 may be disposed in parallel to the first guide groove 41. The second guide groove 43 may be disposed farther from the filter 10 than the first guide groove 41. The second guide groove 43 may be formed so that the brush unit 20 may be moved in a state in which the brush 22 is separated from the filter 10.

Each brush guide 40 may further include a first movement portion 45. The first movement portion 45 may be configured so that the brush unit 20 may be moved from the first guide groove 41 to the second guide groove 43. The first guide groove 41 and the second guide groove 43 are partitioned by a partition wall. However, the first movement portion 45 may be configured so that the brush unit 20 may be freely moved between the first guide groove 41 and the second guide groove 43.

As illustrated in FIG. 11, the first movement portion 45 may be formed in a stepped shape in which a bottom surface 41a of the first guide groove 41 is higher than a bottom surface 43a of the second guide groove 43. Thus, slide members 23 of the brush unit 20, which will be described later, may be moved from the first guide groove 41 to the second guide groove 43. However, the first movement portion 45 may be configured so that the slide members 23 may not be moved from the second guide groove 43 to the first guide groove 41. Hereinafter, driving of the brush unit 20 will be described in detail.

Each brush guide 40 may further include a second movement portion 47. The second movement portion 47 may be configured so that the brush unit 20 may be moved from the second guide groove 43 to the first guide groove 41. The second movement portion 47 may be formed at an opposite side of the brush guide 40 from the first movement portion 45. The second movement portion 47 may be configured to be freely moved between the first guide groove 41 and the second guide groove 43, similarly to the first movement portion 45.

As illustrated in FIG. 12, the second movement portion 47 may be formed in a stepped shape in which the bottom surface 41a of the first guide groove 41 is lower than the bottom surface 43a of the second guide groove 43. Thus, the slide members 23 of the brush unit 20, which will be described later, may be moved from the second guide groove 43 to the first guide groove 41. However, the slide members 23 may be configured not to be moved from the first guide groove 41 to the second guide groove 43.

As illustrated in FIG. 9, the first guide groove 41 and the second guide groove 43 may be disposed so that heights of their bottom surfaces 41a and 43a are different according to their positions. Thus, the first movement portion 45 and the second movement portion 47 may be disposed so that the first guide groove 41 and the second guide groove 43 are in stepped shapes having different heights.

As illustrated in FIGS. 4 and 5, the brush unit 20 may further include the slide members 23 and a first elastic member 24.

The slide members 23 may be installed at both sides of the brush body 21. The slide members 23 may be configured so that one side of each of the slide members 23 may be coupled to the brush body 21 and the other side of each of the slide members 23 may be moved at an inside of the first guide groove 41 or the second guide groove 43.

The first elastic member 24 may be disposed between the brush body 21 and each slide member 23. The first elastic member 24 may be disposed so that each slide member 23 closely contacts the inside of the first guide groove 41 or the second guide groove 43. As described above, since the heights of the bottom surfaces 41a and 43a of the first guide groove 41 and the second guide groove 43 are different according to their positions, the first elastic member 24 may be disposed so that each slide member 23 is maintained in contact with the inside of the first guide groove 41 or the second guide groove 43.

As illustrated in FIGS. 10 and 11, since, in the first movement portion 45, the bottom surface 41a of the first guide groove 41 is formed higher than the bottom surface 43a of the second guide groove 43, each slide member 23 may be moved from the first guide groove 41 to the second guide groove 43.

Each slide member 23 cannot be moved from the first movement portion 45 to the first guide groove 41 that is higher than the second guide groove 43 due to the first elastic member 24. Thus, each slide member 23 may be moved to the first movement portion 45 along the first guide groove 41, and may be moved from the first movement portion 45 to the second guide groove 43. Thereafter, each slide member 23 may be moved in a direction of the second movement portion 47 along the second guide groove 43.

As illustrated in FIGS. 10 and 12, since, in the second movement portion 47, the bottom surface 41a of the first guide groove 41 is formed lower than the bottom surface 43a of the second guide groove 43, each slide member 23 may be moved from the second guide groove 43 to the first guide groove 41.

Each slide member 23 may be moved to the second movement portion 47 along the second guide groove 43, and may be moved from the second movement portion 47 to the first guide groove 41. Thereafter, each slide member 23 may be moved in a direction of the first movement portion 45 along the first guide groove 41.

As illustrated in FIGS. 3 and 4, the brush unit 20 may further include a distance adjustment member 26 and a second elastic member 27.

The distance adjustment member 26 may be provided so that the brush body 21 is maintained at a predetermined distance with the filter 10. The distance adjustment member 26 may be disposed in the first region 25a of the coupling housing 25. The distance adjustment member 26 is disposed between the brush body 21 and the coupling housing 25, and may adjust a distance between the brush body 21 and the filter 10.

The distance adjustment member 26 may include a first adjuster 26a and a second adjuster 26b. The first adjuster 26a may be formed to have a first thickness, and the second adjuster 26b may be formed to have a second thickness. The second thickness of the second adjuster 26b may be thicker than the first thickness of the first adjuster 26a. The distance adjustment member 26 may be provided so that the brush 22 is in contact with the filter 10 when the second adjuster 26b is disposed between the brush body 21 and the coupling housing 25.

The distance adjustment member 26 may be disposed to be movable in the first region 25a of the coupling housing 25. Thus, the distance adjustment member 26 may be moved so that the first adjuster 26a or the second adjuster 26b is disposed between the brush body 21 and the coupling housing 25. The distance adjustment member 26 may adjust a distance between the brush unit 20 and the filter 10 together with the brush guide 40. The distance adjustment member 26 may adjust the distance between the brush unit 20 and the filter 10 in a central region of the brush unit 20.

Figure 15:
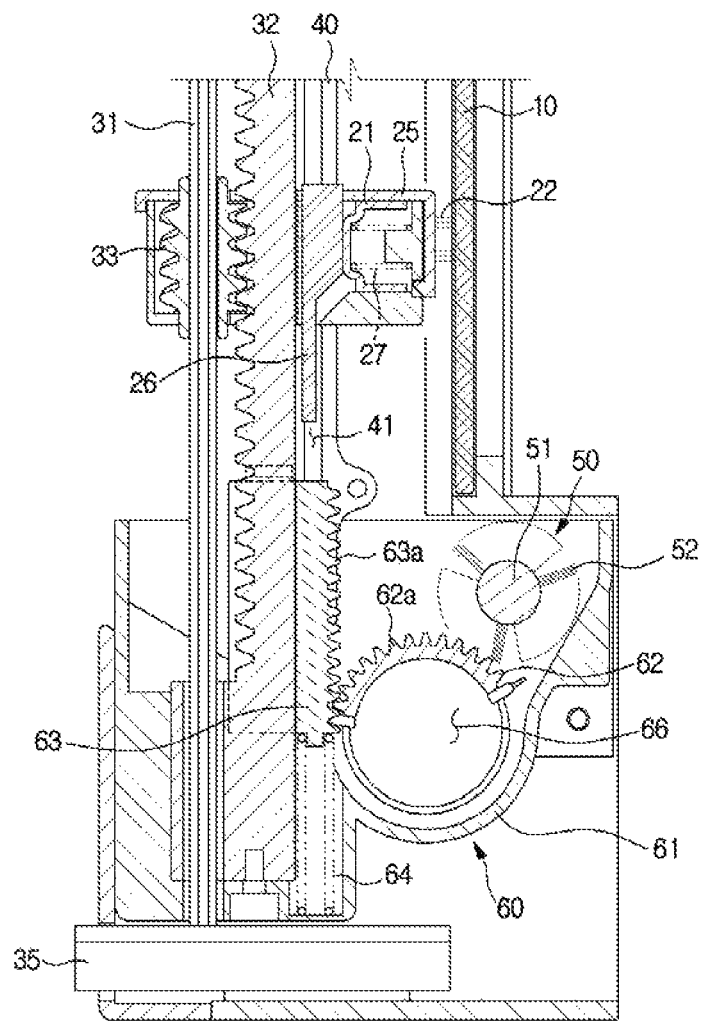
FIGS. 15 through 17 are views illustrating an operation of separating dust from the brush unit of the filter cleaning device of FIG. 1.
Figure 16:
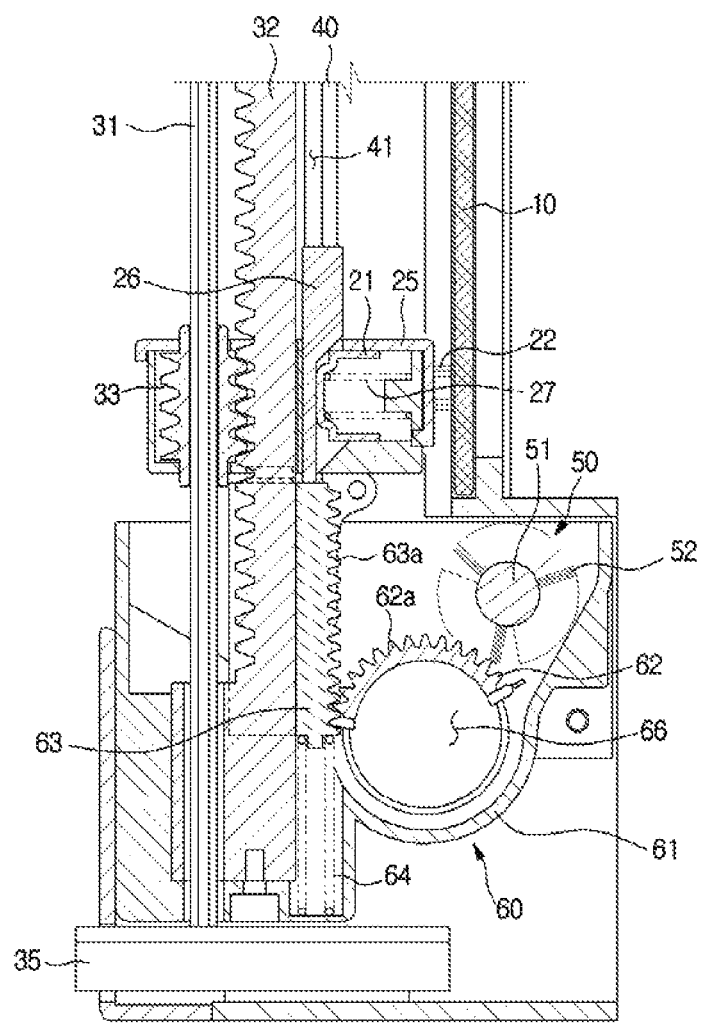

As illustrated in FIGS. 15 and 16, the distance adjustment member 26 may be configured so that a position of the distance adjustment member 26 is changed due to a collision with a cover adjuster 63. When the distance adjustment member 26 collides with the cover adjuster 63, the second adjuster 26b of the distance adjustment member 26 disposed between the brush body 21 and the coupling housing 25 may be changed into the first adjuster 26a. Thus, the distance between the brush unit 20 and the filter 10 may be adjusted.

When the first adjuster 26a is disposed between the brush body 21 and the coupling housing 25, the brush 22 may be separated from the filter 10. When the first adjuster 26a is disposed between the brush body 21 and the coupling housing 25, each slide member 23 may be disposed in the second guide groove 43. When the second adjuster 26b is disposed between the brush body 21 and the coupling housing 25, the brush 22 may be disposed so that the brush 22 is in contact with the filter 10. When the second adjuster 26b is disposed between the brush body 21 and the coupling housing 25, each slide member 23 may be disposed in the first guide groove 41.

The second elastic member 27 may be disposed between the distance adjustment member 26 and the coupling housing 25 in the first region 25a of the coupling housing 25. The second elastic member 27 may be disposed in an opposite direction to the distance adjustment member 26 centering on the brush body 21. The second elastic member 27 may be disposed so that the brush body 21 is maintained in contact with the distance adjustment member 26. Even when the distance adjustment member 26 is moved, the second elastic member 27 may be disposed so that the brush body 21 is maintained in contact with the distance adjustment member 26.

Through the above-described configuration, when the filter cleaning device 1 is in contact with the filter 10, the filter cleaning device 1 separates dust attached to the filter 10 from the filter 10 when the brush unit 20 is moved in one direction. Subsequently, the brush unit 20 may be moved to be separated from the filter 10. In this way, the filter cleaning device 1 separates the brush unit 20 for cleaning the filter 10 from the filter 10 so that the brush 22 which has attached foreign substances is not in contact with the filter 10. Thus, re-contamination of the filter 10 is prevented, and cleaning efficiency may be improved. In addition, since unnecessary friction between the filter 10 and the brush 22 may be reduced, durability of a product may be improved.

Figure 13:
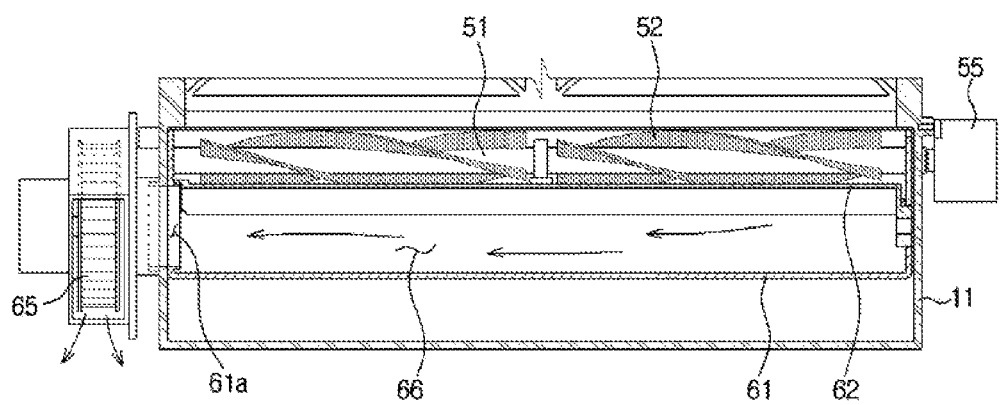
FIG. 13 is a cross-sectional view of a dust separation member and the dust discharge unit of the filter cleaning device of FIG. 1 in a front direction.
Figure 14:
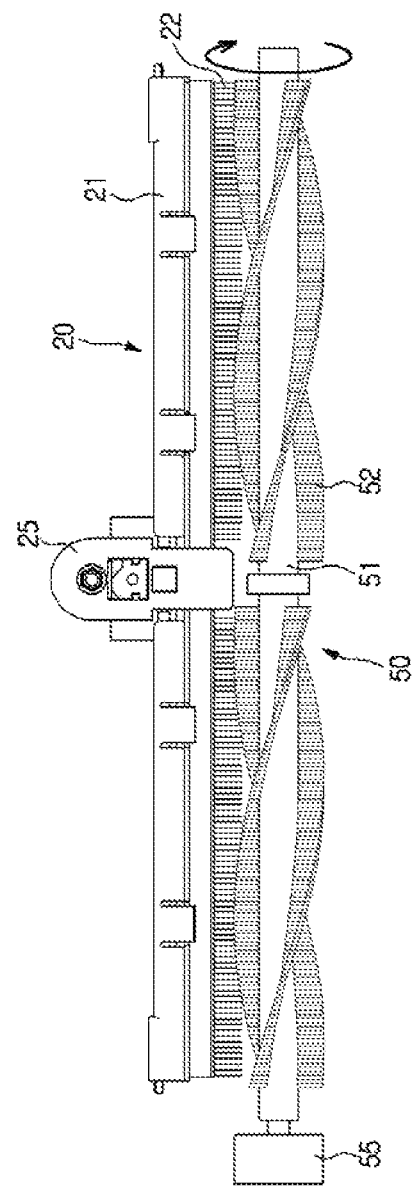
FIG. 14 is a view of the brush unit and the dust separation member of the filter cleaning device of FIG. 1 in an upward direction.
Figure 17:
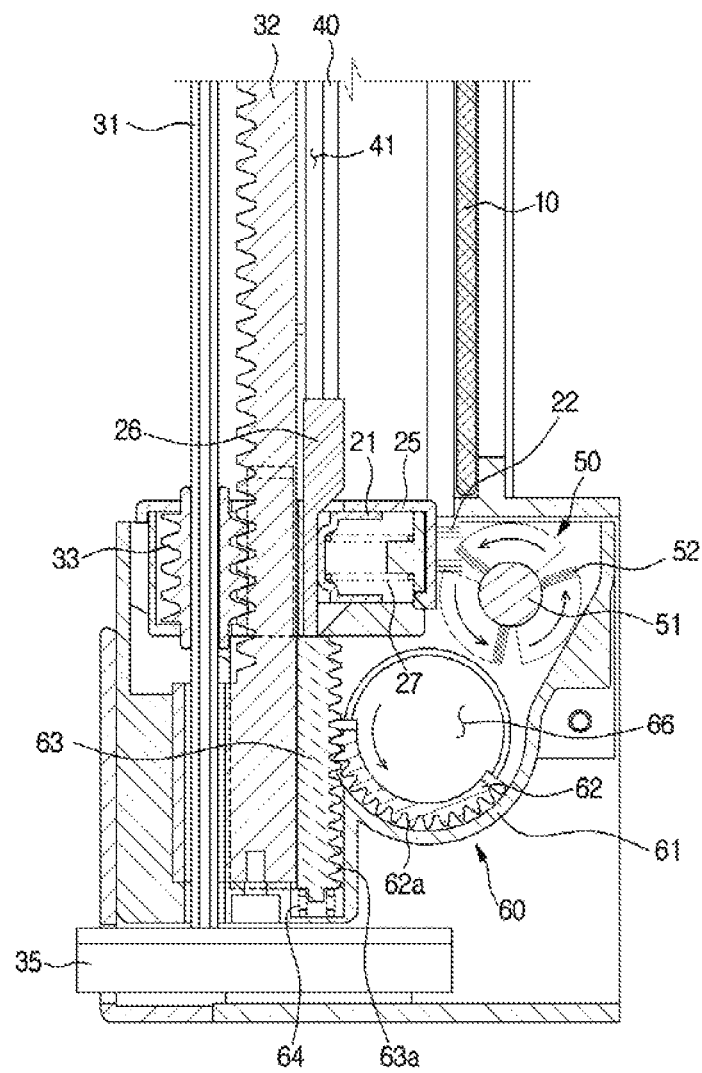

FIG. 13 is a cross-sectional view of a dust separation member and the dust discharge unit of the filter cleaning device 1 of FIG. 1 in a front direction, FIG. 14 is a view of the brush unit 20 and the dust separation member of the filter cleaning device 1 of FIG. 1 in an upward direction, and FIGS. 15 through 17 are views illustrating an operation of separating dust from the brush unit 20 of the filter cleaning device 1 of FIG. 1.

Referring to FIGS. 13 through 17, the filter cleaning device 1 may further include a dust separation member 50.

The dust separation member 50 may be disposed at one side of the brush unit 20. The dust separation member 50 may be installed in a position at which the brush 22 of the brush unit 20 may contact a lower portion of the filter 10. The dust separation member 50 may be rotatably disposed. When the dust separation member 50 is rotated, the dust separation member 50 may separate foreign substances attached to the brush 22.

The dust separation member 50 may include a rotating body 51, a dust separator 52, and a motor 55. The rotating body 51 may be disposed in parallel with one side of the filter 10. The rotating body 51 may be disposed in a cylindrical shape formed to have the same length as a length of one side of the filter 10. The rotating body 51 may be installed to be rotatable by receiving a rotational force from the motor 55. The rotating body 51 may be disposed to be rotated about a rotation shaft in a lengthwise direction of the rotating body 51.

The dust separator 52 may be formed at a side of the rotation shaft of the rotating body 51. When the dust separator 52 is rotated due to rotation of the rotating body 51, the dust separator 52 may separate dust attached to the brush 22.

As illustrated in FIGS. 13 and 14, the dust separator 52 may be formed in a spiral shape in the rotating body 51. Thus, when the dust separator 52 is rotated, the dust separator 52 may be sequentially in contact with one side to the other side of the brush 22, and may separate dust from the brush 22. Through this configuration, the dust separator 52 may separate foreign substances attached to the brush 22 more effectively.

The dust separator 52 may be formed of a material having a restoring force. The dust separator 52 may also be provided with the same brush as a brush used in the brush unit 20.

The filter cleaning device 1 may further include a dust discharge unit 60. The dust discharge unit 60 may discharge the foreign substances separated from the brush unit 20 by the dust separator 52 to the outside.

The dust discharge unit 60 may include a suction case 61, the cover adjuster 63, a restoring member 64, and a suction motor 65. As illustrated in FIG. 2, the dust discharge unit 60 may be installed in a space in which the frame 11 and a frame cover 13 are formed.

The suction case 61 may be disposed below the dust separation member 50 and the brush unit 20. The suction case 61 may be disposed in a shape in which an upper portion of the suction case 61 is open. Thus, the suction case 61 may be disposed so that the foreign substances separated from the brush 22 may be introduced into an upper opening of the suction case 61.

The suction cover 62 is coupled to the suction case 61 and may form an interior space 66. A suction hole 61a may be formed in one side of the interior space 66 formed by the suction cover 62 and the suction case 61. The suction hole 61a may function as a path through which the foreign substances moved into the interior space 66 of the suction case 61 are moved to an outside of the suction case 61.

The suction cover 62 may be installed so as to be able to open and close the opening of the suction case 61. When the suction cover 62 is rotated along the suction case 61, the suction cover 62 may open or close the interior space 66.

The cover adjuster 63 may be disposed to be able to be moved upward and downward along each rack gear 32. The cover adjuster 63 may be disposed to be able to be moved upward and downward along the rack gear guide groove 32b of each rack gear 32.

The cover adjuster 63 may overlap the brush unit 20 when viewed from an upward direction. The cover adjuster 63 may be disposed on a movement path of the brush unit 20 so that the brush unit 20 may collide with the cover adjuster 63 when moved. Thus, the position of the cover adjuster 63 may be changed due to the collision with the brush unit 20.

The cover adjuster 63 may include a first gear portion 63a formed therein. The first gear portion 63 a may be disposed to be opposite a part of the suction cover 62. The first gear portion 63a may be disposed to be engaged with a second gear portion 62a formed at an outside of the suction cover 62. Thus, when the position of the cover adjuster 63 is moved, the cover adjuster 63 may move the suction cover 62 by rotation. The cover adjuster 63 may be configured so that the suction cover 62 opens or closes the suction case 61 when the position of the cover adjuster 63 is moved.

The restoring member 64 may be installed under the cover adjuster 63. The restoring member 64 may be disposed at an opposite side from the brush unit 20 centering on the cover adjuster 63. The cover adjuster 63 may be disposed between a first position and a second position due to the restoring member 64. The first position is a position of the cover adjuster 63 in a state in which the cover adjuster 63 and the brush unit 20 are not in contact, and the second position is a position in which the cover adjuster 63 is moved to a maximum extent due to a collision with the brush unit 20.

In detail, the cover adjuster 63 may be moved from the first position to the second position due to a collision with the brush unit 20. When the cover adjuster 63 is moved from the first position to the second position, the cover adjuster 63 may be moved to a position in which the suction cover 62 opens the suction case 61. Thus, when the brush unit 20 is moved to a position in which it is in contact with the dust separation member 50, the brush unit 20 moves the cover adjuster 63 to the second position, and the cover adjuster 63 may be disposed so that the suction cover 62 opens the suction case 61.

When the brush unit 20 is separated from the filter 10 and is moved upward, the cover adjuster 63 may be moved from the second position to the first position. When the cover adjuster 63 is separated from the brush unit 20, the cover adjuster 63 may be restored to the first position due to the restoring member 64. Thus, the cover adjuster 63 may be moved to a position in which the suction cover 62 closes the suction case 61.

As described above, the dust discharge unit 60 may be disposed so that the suction cover 62 opens and closes the suction case 61 according to movement of the brush unit 20. Thus, when the brush 22 is moved to a vicinity of the dust separation member 50 and the foreign substances are separated from the brush 22, the brush 22 may be moved so that the suction cover 62 opens the suction case 61. The dust separation member 50 separates the foreign substances attached to the brush 22 when the suction cover 62 opens the suction case 61, and thus the separated foreign substances may be moved into the interior space 66 of the opened suction case 61.

In addition, when the brush 22 is separated from the filter 10 and moved in a state in which the foreign substances are separated from the brush 22, the brush 22 may be moved so that the suction cover 62 closes the opening of the suction case 61, and may form the interior space 66. The foreign substances moved into the interior space 66 may be easily discharged to the outside through the suction hole 61 a due to a suction force transferred from the suction motor 65 connected to the suction hole 61a.

Hereinafter, a filter cleaning device 100 in accordance with another embodiment of the present disclosure will be described.

Figure 18:
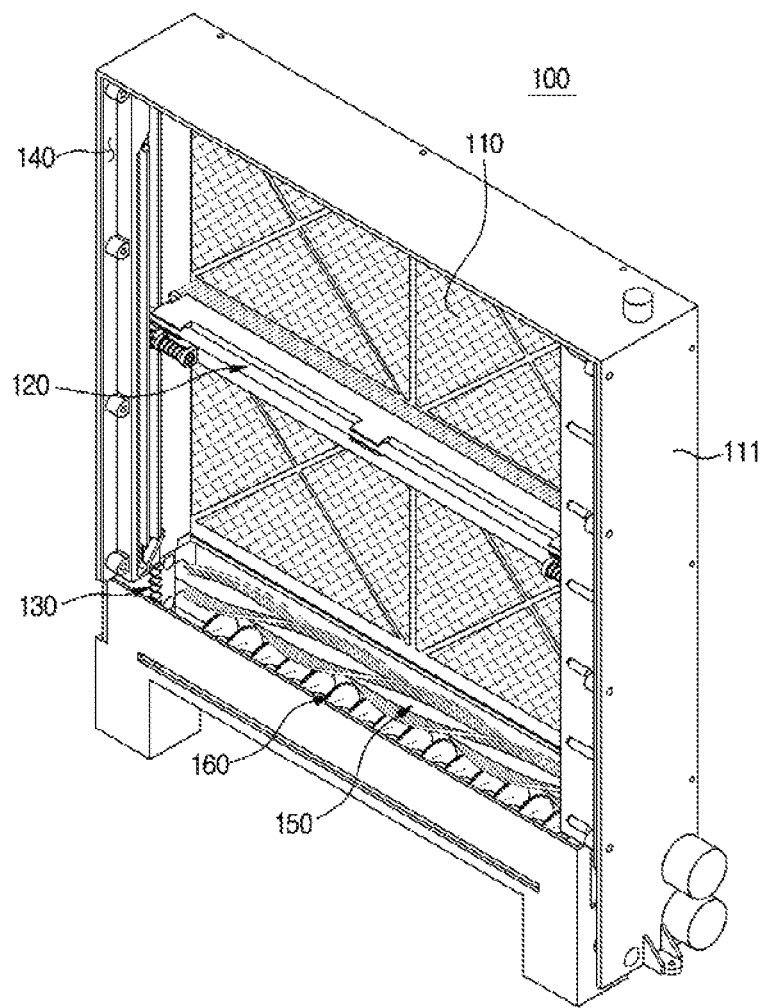
FIG. 18 is a view illustrating an exterior of a filter cleaning device in accordance with another embodiment of the present disclosure.
Figure 19:
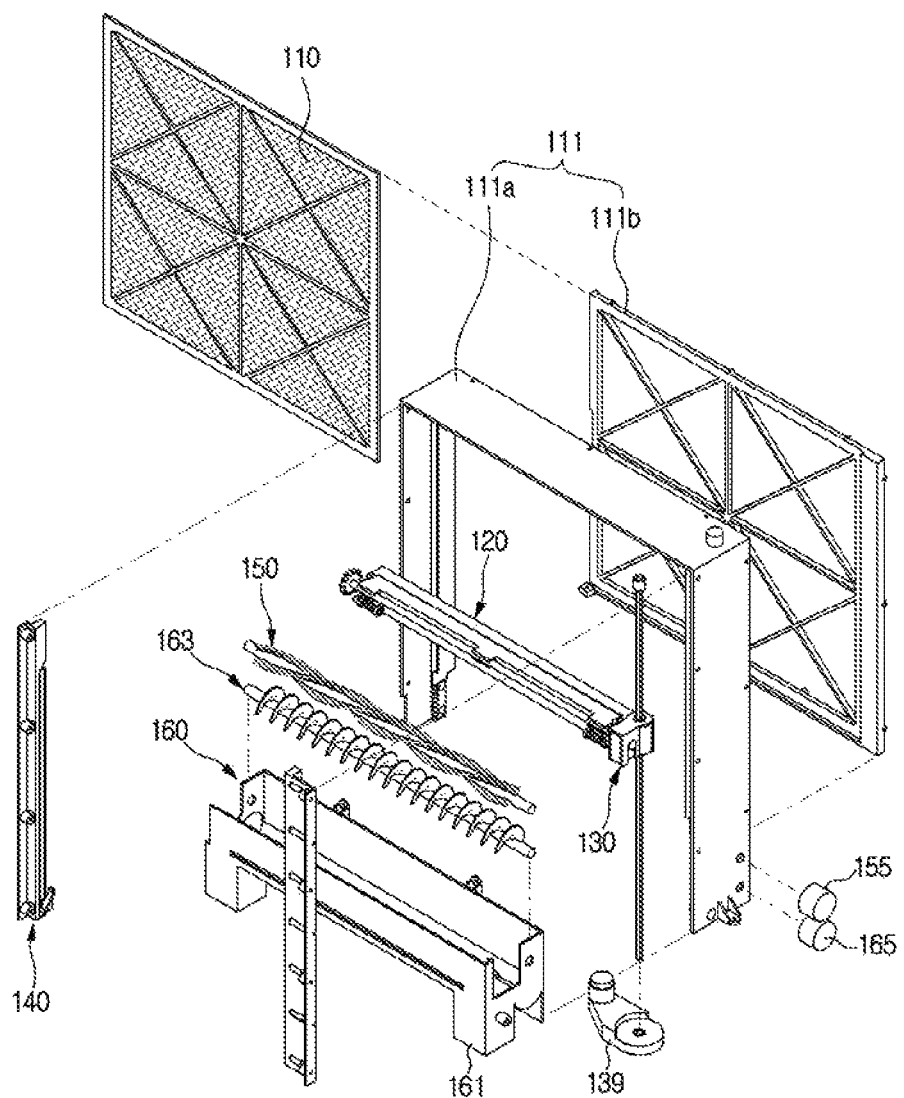
FIG. 19 is an exploded perspective view of a configuration of the filter cleaning device of FIG. 18.
Figure 20:
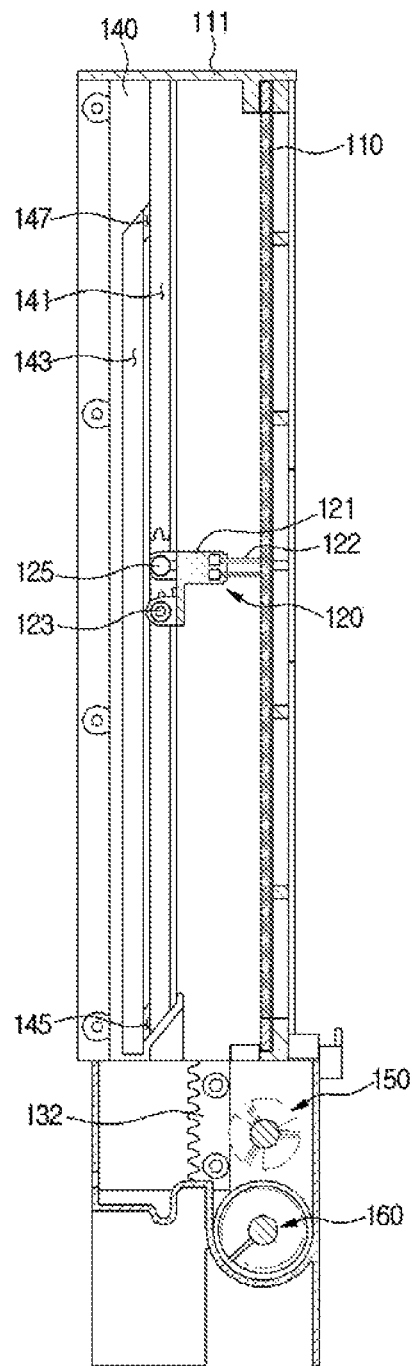
FIG. 20 is a view illustrating a latitudinal section of the filter cleaning device of FIG. 18.
Figure 21:
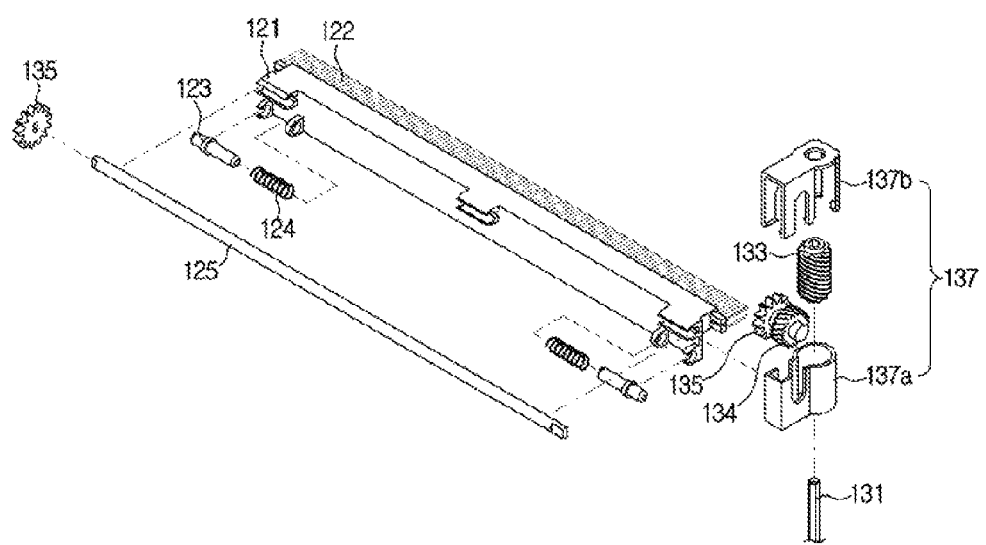
FIG. 21 is an exploded perspective view of a configuration of a brush unit and a brush movement unit of the filter cleaning device of FIG. 18.
Figure 22:
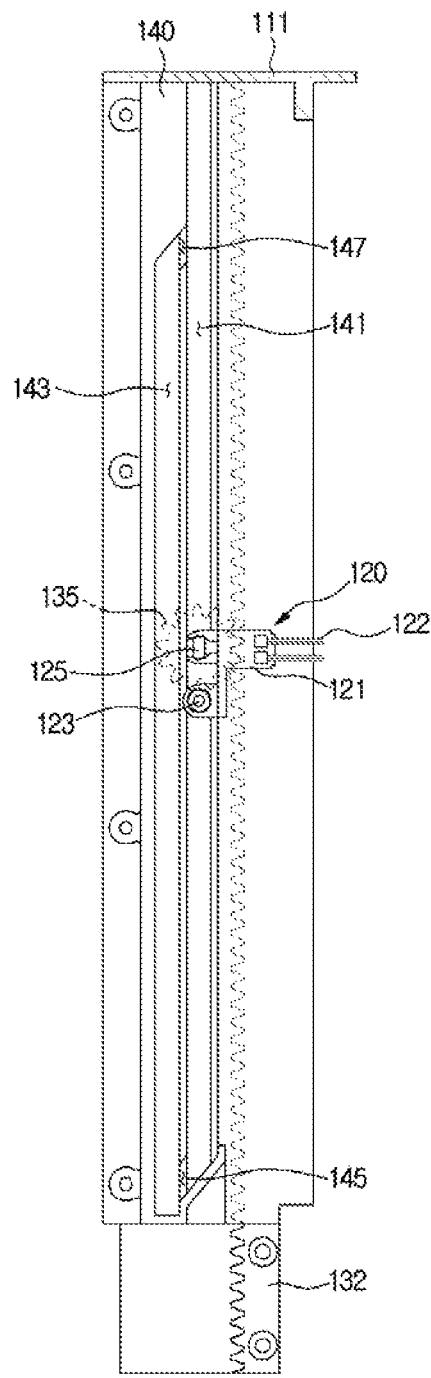
FIG. 22 is a view illustrating brush guides of the filter cleaning device of FIG. 18.
Figure 23:
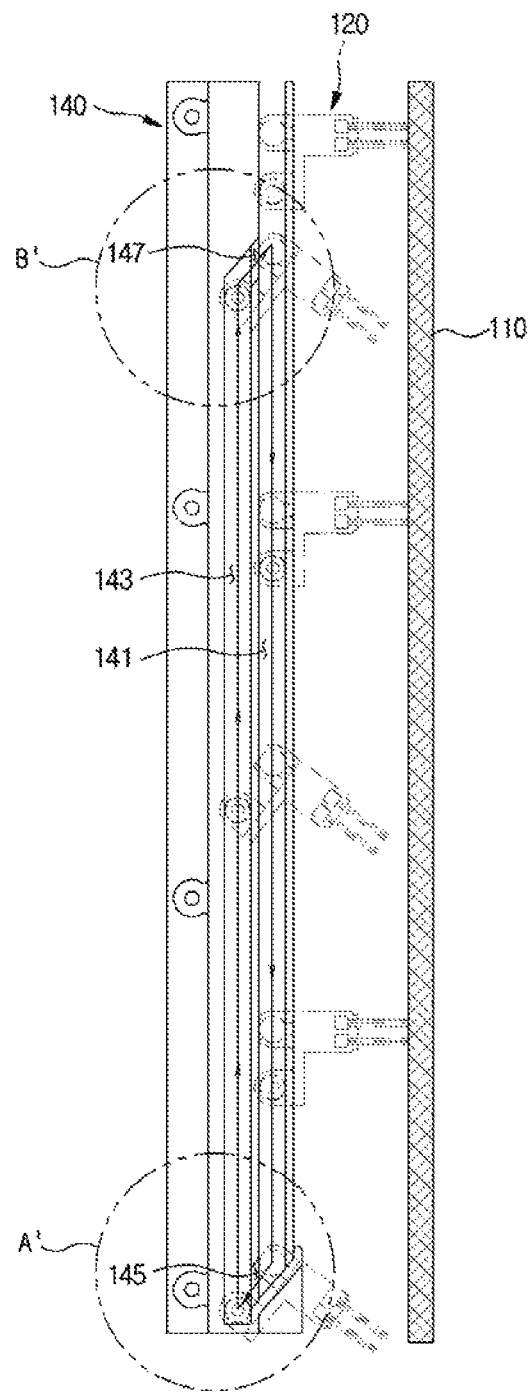
FIG. 23 is a view schematically illustrating a path through which the brush unit of the filter cleaning device of FIG. 18 is moved along the brush guide.
Figure 24:
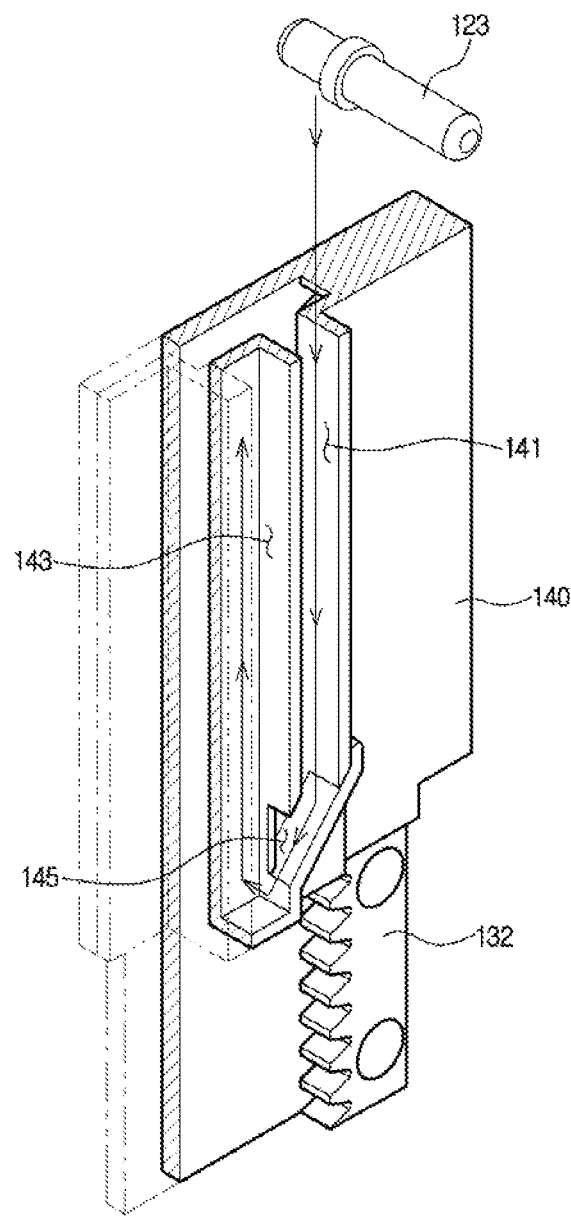
FIG. 24 is an enlarged view of region A' of FIG. 23.
Figure 25:
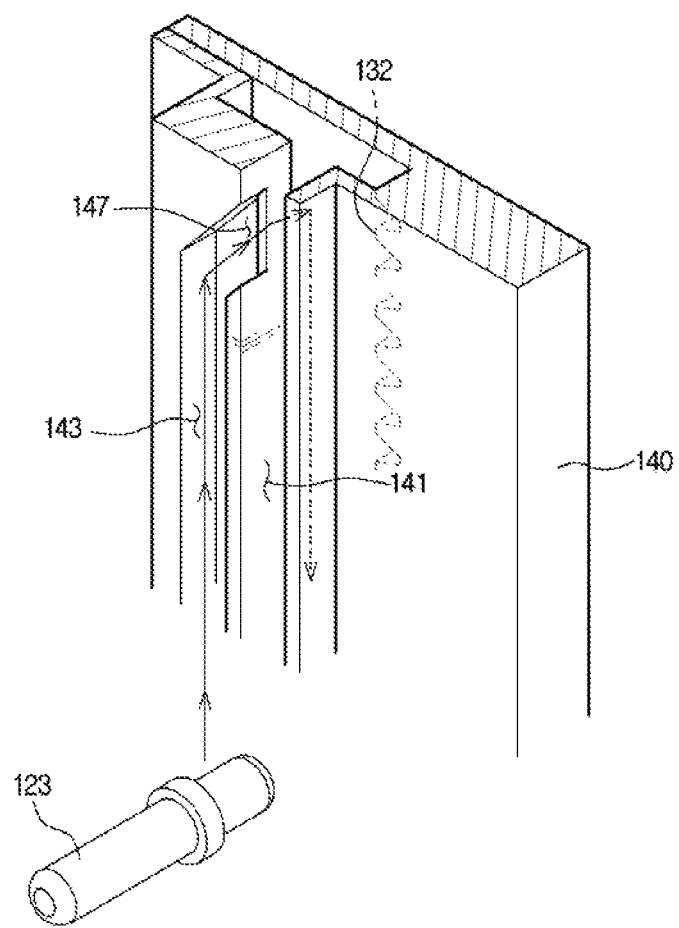
FIG. 25 is an enlarged view of region B' of FIG. 23.

FIG. 18 is a view illustrating an exterior of the filter cleaning device 100 in accordance with another embodiment of the present disclosure, FIG. 19 is an exploded perspective view of a configuration of the filter cleaning device 100 of FIG. 18, FIG. 20 is a view illustrating a latitudinal section of the filter cleaning device 100 of FIG. 18, FIG. 21 is an exploded perspective view of a configuration of a brush unit and a brush movement unit of the filter cleaning device 100 of FIG. 18, FIG. 22 is a view illustrating a brush guide of the filter cleaning device 100 of FIG. 18, FIG. 23 is a view schematically illustrating a path through which the brush unit of the filter cleaning device 100 of FIG. 18 is moved along a brush guide, FIG. 24 is an enlarged view of region A' of FIG. 23, and FIG. 25 is an enlarged view of region B' of FIG. 23.

Referring to FIGS. 18 through 25, the filter cleaning device 100 may include a filter 110, a brush unit 120, a brush movement unit 130, and brush guides 140. The brush unit 120, the brush movement unit 130, and the brush guides 140 may be disposed to have similar functions as those of the filter cleaning device 1 illustrated in FIG. 1 and only a part of the configuration is different from that of the filter cleaning device 1 of FIG. 1. Hereinafter, differences between the filter cleaning device 100 illustrated in FIG. 18 and the filter cleaning device 1 illustrated in FIG. 1 will be described, and a description of the same or similar configurations of the filter cleaning device 100 of FIG. 18 and the filter cleaning device 1 of FIG. 1 will be omitted.

As illustrated in FIG. 21, the brush unit 120 may include a brush body 121, a brush 122, a slide member 123, an elastic member 124, and a first shaft 125.

The slide member 123 may be disposed so that one side of the slide member 123 is connected to the brush body 121 and the other side of the slide member 123 is moved along each brush guide 140. The slide member 123 may be disposed to be movable at insides of a first guide groove 141 and a second guide groove 143 formed in each brush guide 140.

The elastic member 124 may be disposed between the brush body 121 and the slide member 123. The elastic member 124 may be disposed so that the slide member 123 closely contacts the inside of the first guide groove 141 or the second guide groove 143. Since the first guide groove 141 and the second guide groove 143 of each brush guide 140 are disposed to have different heights of bottom surfaces thereof according to their positions, the elastic member 124 may be disposed so that the slide member 123 is maintained in contact with the inside of the first guide groove 141 or the second guide groove 143.

The first shaft 125 may be disposed to extend in parallel to the brush body 121. The first shaft 125 may be formed to extend in a lengthwise direction of the brush body 121. The first shaft 125 may be coupled to the brush body 121 to be moved to one side or the other side of the filter 110 together with the brush body 121. The first shaft 125 may be rotatably coupled to the brush body 121.

Elevation gears 135 of the brush movement unit 130, which will be described later, may be coupled to both sides of the first shaft 125. When the first shaft 125 is rotated together with the elevation gears 135 due to a rotational force transferred from the brush movement unit 130, it may be moved to one side or the other side of the filter 110.

The brush movement unit 130 may be configured to move the brush unit 120 along the filter 110. The brush movement unit 130 may include a second shaft 131, rack gears 132, worm gears 133, worm wheel gears 134, the elevation gears 135, a coupling housing 137, and a driving member 139.

The second shaft 131 may be disposed in a direction perpendicular to the brush body 121. The second shaft 131 is connected to the driving member 139 and may receive the rotational force generated by the driving member 139. The second shaft 131 may transfer the rotational force transferred to the first shaft 125 through the rack gears 132, the worm gears 133, and the worm wheel gears 134.

The rack gears 132 may be installed in a direction perpendicular to the brush body 121. The rack gears 132 may be disposed at both sides of the filter 110. The rack gears 132 may be disposed to be engaged with the elevation gears 135 coupled to the first shaft 125. Thus, the rack gears 132 may be disposed to be moved together with the brush unit 120 coupled to the first shaft 125 due to rotation of the elevation gears 135.

The worm gears 133 may be coupled to be moved along the second shaft 131. The worm gears 133 may be configured to be rotated together with the second shaft 131 and to be moved along the second shaft 131. The worm gears 133 may be disposed to be engaged with the rack gears 132 and rotated. Thus, the worm gears 133 may be configured to be moved to both sides of the second shaft 131 according to a rotation direction of the worm gears 133 when rotated together with the second shaft 130.

The worm gears 133 may be disposed inside the coupling housing 137. The coupling housing 137 may include a body 137a having a shape in which a top surface of the body 137a is opened, and a cover 137b coupled to the top surface of the body 137a. The worm gears 133 may be disposed in an interior space formed by coupling the body 137a and the cover 137b.

The worm wheel gears 134 may be disposed in the interior space of the coupling housing 137 so as to be engaged with the worm gears 133. The worm wheel gears 134 may be configured so that gear portions of the worm wheel gears 134 are engaged with the worm gears 133 and a rotation shaft is coupled to the first shaft 125. Thus, the worm wheel gears 134 receive the rotational force of the second shaft 131 from the worm gears 133 and may transfer the rotational force to the first shaft 125. The worm wheel gears 134 may be disposed to transfer the rotational force of the second shaft 131 to the first shaft 125 disposed in a position perpendicular to the second shaft 131 so that the first shaft 125 is rotated.

The elevation gears 135 may be configured to be rotated together with the first shaft 125. The elevation gears 135 may be disposed at sides of the worm wheel gears 134. The elevation gears 135 may be disposed to be rotated together with the worm wheel gears 134 and the first shaft 125. The elevation gears 135 may be disposed to engage with the rack gears 132 to be moved along the rack gears 132. Thus, the brush unit 120 including the first shaft 125 coupled to the elevation gears 135 may be moved along the rack gears 132.

The brush guides 140 may be installed at both sides of the brush unit 120. Each of the brush guides 140 may guide a movement of each of both sides of the brush unit 120 and may guide movement of the brush unit 120.

Each brush guide 140 may include a first guide groove 141, a second guide groove 143, a first movement portion 145, and a second movement portion 147. The first guide groove 141, the second guide groove 143, the first movement portion 145, and the second movement portion 147 may be configured to have the same configurations of the first guide groove 41, the second guide groove 43, the first movement portion 45, and the second movement portion 47 of the filter cleaning device 1 of FIG. 1. Each brush guide 140 may be disposed so that the slide member 123 is moved in the first guide groove 141, the second guide groove 143, the first movement portion 145, and the second movement portion 147.

Each brush guide 140 may be disposed adjacent to the rack gears 132. Each brush guide 140 guides the slide member 123, and the rack gears 131 may be provided to guide the first shaft 125 so that the brush unit 120 coupled to the first shaft 125 and the slide member 123 is moved.

As illustrated in FIG. 23, when the slide member 123 is moved along the first guide groove 41, the brush unit 120 is in contact with the filter 110, and may be moved while cleaning the filter 110. When the slide member 123 is moved into the second guide groove 43 through the first movement portion 45, the slide member 123 is moved in a direction in which the slide member 123 is away from the filter 110. However, since a distance between the first shaft 125 and the filter 110 is maintained at a constant level, the brush unit 120 may be rotated.

When the brush unit 120 is rotated, the brush 122 may be separated from the filter 110. When the slide member 123 is moved from the second guide groove 143, the brush unit 120 is rotated and may be moved in a state in which the brush 122 is separated from the filter 110.

Figure 26:
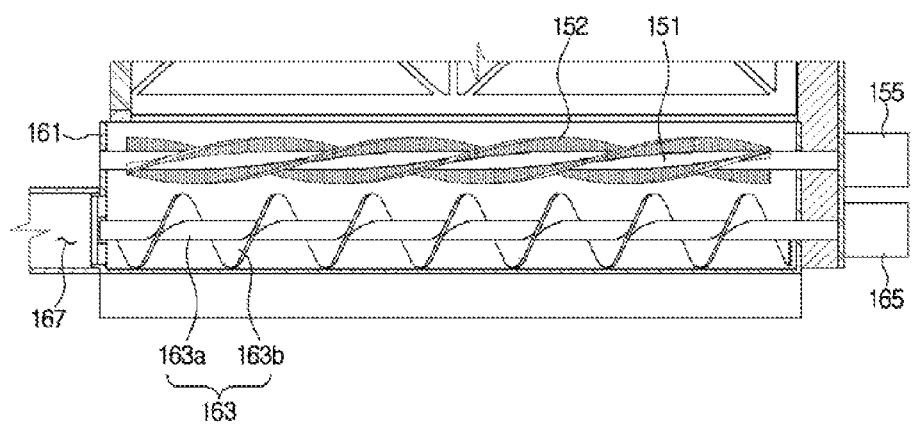
FIG. 26 is a cross-sectional view of a dust separation member and a dust discharge unit of the filter cleaning device of FIG. 18 in a front direction.
Figure 27:
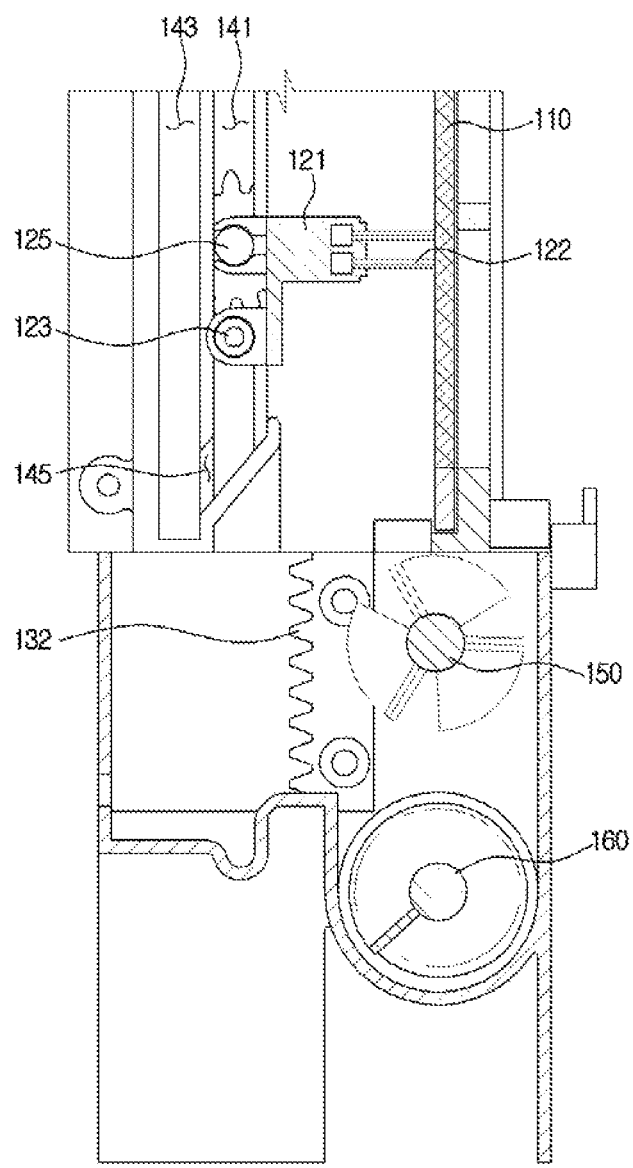
FIGS. 27 and 28 are views illustrating an operation of separating dust from the brush unit of the filter cleaning device of FIG. 18.
Figure 28:
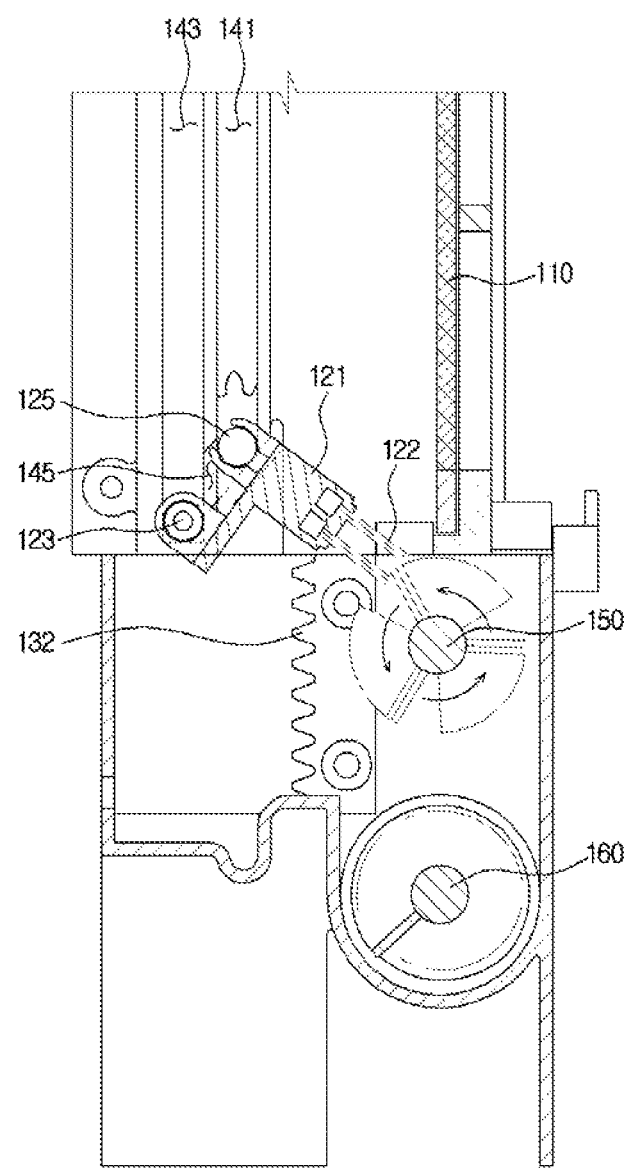

FIG. 26 is a cross-sectional view of a dust separation member and a dust discharge unit of the filter cleaning device 100 of FIG. 18 in a front direction, and FIGS. 27 and 28 are views illustrating an operation of separating dust from the brush unit 120 of the filter cleaning device 100 of FIG. 18.

The filter cleaning device 100 may further include a dust separation member 150. The dust separation member 150 may include a rotating body 151, a dust separator 152, and a first motor 155. The dust separation member 150 may be disposed to have the same configuration as that of the dust separation member 50 of FIG. 1.

The filter cleaning device 100 may further include a dust discharge unit 160. The dust discharge unit 160 may include a suction case 161, a dust discharge member 163, a second motor 165, and a discharge port 167.

The dust discharge unit 160 of the filter cleaning device 100, when compared with the dust discharge unit 60 of FIG. 1, is configured to include the dust discharge member 163 instead of the suction cover 62, the cover adjuster 63, and the restoring member 64.

The dust discharge member 163 may be disposed below the dust separation member 150. The dust discharge member 163 may be rotatably connected to the second motor 165. The dust discharge member 163 may include a rotation shaft 163a and at least one blade 163b installed at sides of the rotation shaft 163a. The at least one blade 163b may be formed in a spiral shape. Thus, when the rotation shaft 163a is rotated, the spiral-shaped blades 163b are rotated so that foreign substances separated from the filter 110 may be moved in one direction along the blades 163b. When the dust discharge member 163 is rotated, the dust discharge member 163 may move the foreign substances to the discharge port 167.

According to the spirit of the present disclosure, cleaning efficiency of a filter can be improved.

In detail, a filter cleaning device is configured to be in contact with or separated from the filter depending on a movement path of a brush for removing dust of the filter so that dust separation efficiency can be improved.

In addition, a dust separation member is formed in a spiral shape to effectively separate dust from the brush, and a suction case which moves the separated dust to the outside is formed to be opened or closed so that the separated dust can be easily discharged to the outside.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A filter cleaning device comprising:
a filter;
a brush unit movably installed at one side of the filter to separate dust from the filter;
a brush movement unit configured so that the brush unit is movable along the filter; and
brush guides installed at two sides of the brush unit to guide a movement of the brush unit,
wherein each of the brush guides comprises:
a first guide groove formed so that the brush unit is moved to be in contact with the filter; and
a second guide groove formed so that the brush unit is moved to be separated from the filter.

2. The filter cleaning device according to claim 1, wherein each of the brush guides further comprises a first movement portion formed so that the brush movement unit is movable between the first guide groove and the second guide groove, and
in the first movement portion, the first guide groove is provided as a stepped shape higher than the second guide groove.

3. The filter cleaning device according to claim 2, wherein each of the brush guides further comprises a second movement portion that is formed at an opposite side to the first movement portion and formed so that the brush movement unit is movable between the first guide groove and the second guide groove, and in the second movement portion, the first guide groove is provided as a stepped shape lower than the second guide groove.

4. The filter cleaning device according to claim 1, wherein the brush unit comprises:
a brush body;
a brush installed in the brush body facing the filter;
slide members installed at two sides of the brush body and provided to be movable at insides of the first guide groove and the second guide groove; and
a first elastic member installed between each slide member and the brush body.

5. The filter cleaning device according to claim 4, wherein the brush unit further comprises:
a coupling housing comprising a first region coupled to the brush body and a second region movably coupled to the brush movement unit;
a distance adjustment member disposed in contact with one side of the brush body so as to move the brush body in the first region; and
a second elastic member disposed between the brush body and the coupling housing at an opposite side of the distance adjustment member in the first region.

6. The filter cleaning device according to claim 5, wherein the distance adjustment member comprises:
a first adjuster having a first thickness; and
a second adjuster having a second thickness that is thicker than the first thickness.

7. The filter cleaning device according to claim 5, wherein the brush movement unit comprises:
a shaft provided to be rotatable and extending in a movement direction of the brush unit;
rack gears formed in parallel with the shaft;
worm gears coupled to be movable along the shaft when rotated in engagement with the rack gears according to a rotation direction of the shaft; and
a driving member configured to generate a rotational force which is transferred to the shaft,
wherein the worm gears are disposed in the second region and are movable together with the brush unit.

8. The filter cleaning device according to claim 4, further comprising a dust separation member disposed below the filter so as to separate dust attached to the brush,
wherein the dust separation member comprises:
a rotating body disposed in parallel with the brush body;
a motor configured to transfer a rotational force to the rotating body; and
a dust separator formed at an outside of the rotating body so as to separate the dust attached to the brush when the dust separator is rotated together with the rotating body.

9. The filter cleaning device according to claim 8, wherein the dust separator is provided in a spiral shape.

10. The filter cleaning device according to claim 8, further comprising a dust discharge unit configured to move the dust separated from the brush,
wherein the dust discharge unit comprises:
a suction case formed below the dust separator and the brush and having an opening into which the dust separated from the brush is introduced;
a suction motor configured to generate a suction force which is transferred to the suction case; and
a suction cover configured to open and close the opening.

11. The filter cleaning device according to claim 10, wherein the dust discharge unit further comprises a cover adjuster coupled to be movable along the brush movement unit and having a first gear portion formed in a side opposite to the suction cover, and the suction cover comprises a second gear portion formed to be opposite to the first gear portion so as to be engaged with the first gear portion.

12. The filter cleaning device according to claim 11, wherein the cover adjuster is configured to be moved between a first position and a second position, and the cover adjuster is disposed on a movement path of the brush unit, is configured to be moved from the first position to the second position to be in contact with the brush unit, and is configured to move the suction cover so that the opening is opened.

13. The filter cleaning device according to claim 12, wherein the dust discharge unit further comprises a restoring member installed at one side of the cover adjuster, and
the restoring member is configured to restore the cover adjuster from the second position to the first position.

* * * * *